(12) United States Patent
Kalafut et al.

(10) Patent No.: US 10,671,030 B2
(45) Date of Patent: Jun. 2, 2020

(54) WEB-BASED INTERACTION WITH BUILDING AUTOMATION

(71) Applicants: Robert L. Kalafut, Downers Grove, IL (US); Gerhard Brun, Lucerne (CH); Andreas Schlumberger, Baar (CH); Ralph Sigrist, Steinhausen (CH)

(72) Inventors: Robert L. Kalafut, Downers Grove, IL (US); Gerhard Brun, Lucerne (CH); Andreas Schlumberger, Baar (CH); Ralph Sigrist, Steinhausen (CH)

(73) Assignee: Siemens Schweiz AG, Zug (CH)

( * ) Notice: Subject to any disclaimer, the term of this patent is extended or adjusted under 35 U.S.C. 154(b) by 427 days.

(21) Appl. No.: 14/099,082

(22) Filed: Dec. 6, 2013

(65) Prior Publication Data

US 2015/0160628 A1   Jun. 11, 2015

(51) Int. Cl.
*G05B 19/042* (2006.01)
*H04L 12/28* (2006.01)
(Continued)

(52) U.S. Cl.
CPC .......... *G05B 15/02* (2013.01); *H04L 12/2803* (2013.01); *H04L 12/2836* (2013.01);
(Continued)

(58) Field of Classification Search
CPC ............... H04L 12/2818; H04L 12/282; H04L 2012/4026; H04L 2012/40228; H04L 12/2803; G05B 2219/2642
(Continued)

(56) References Cited

U.S. PATENT DOCUMENTS 6,028,998 A    2/2000  Gloudeman et al.
6,198,479 B1 *  3/2001  Humpleman ....... H04L 12/2805
                                                 348/E5.006
(Continued)

FOREIGN PATENT DOCUMENTS

CN    103201689 A    7/2013

OTHER PUBLICATIONS

Peter M. Corcoran et al: "Browser-Style Interfaces to a Home Automation Network", vol. 43, No. 4, Nov. 1, 1997, pp. 1063-1069, XP011008489, 7 pages.
(Continued)

*Primary Examiner* — Tonia L Dollinger
*Assistant Examiner* — Jonathan A Sparks (57) ABSTRACT

Web-based interaction with building automation is provided. The interaction, regardless of the access point, is browser based. For IP access, hypertext protocol (http) communications of the browser are performed. The web-enabled controller serves responses with building automation information. For non-IP access, a web-server operating as an application in the same device as the browser intercepts the http communication and reformats the communication as appropriate for the non-IP access. Based on a response from the building automation system, the device local web-server responds to the browser. For communicating across different types of networks in the building automation system, controllers may use the embedded web-server to reformat as needed and route requests. The same look, feel, functionality, and/or usability may be provided using the browser regardless of the connectivity to the building automation network.

13 Claims, 8 Drawing Sheets (51) Int. Cl.
*G05B 15/02* (2006.01)
*H04L 29/08* (2006.01)
*H04L 12/40* (2006.01)

(52) U.S. Cl.
CPC .............. *H04L 67/02* (2013.01); *H04L 67/12* (2013.01); *G05B 2219/2642* (2013.01); *H04L 2012/4026* (2013.01); *H04L 2012/40221* (2013.01); *H04L 2012/40228* (2013.01)

(58) Field of Classification Search
USPC ......................................... 709/220; 340/5.64
See application file for complete search history.

(56) References Cited

U.S. PATENT DOCUMENTS

| | | | |
|---|---|---|---|
| 6,353,853 | B1 | 3/2002 | Gravlin |
| 6,744,771 | B1* | 6/2004 | Barber .................. G08B 25/08 370/400 |
| 2001/0049718 | A1* | 12/2001 | Ozawa .................. H04N 7/163 709/203 |
| 2005/0021839 | A1* | 1/2005 | Russell .................. H04L 29/06 709/238 |
| 2007/0069850 | A1* | 3/2007 | Anderson, Jr. ......... G05B 15/02 340/3.51 |
| 2008/0082637 | A1* | 4/2008 | Krainz ................ H04L 41/0253 709/220 |
| 2008/0104189 | A1* | 5/2008 | Baker .................... G05B 19/05 709/206 |
| 2009/0006611 | A1* | 1/2009 | Hong .................... H04L 43/028 709/224 |
| 2009/0077624 | A1* | 3/2009 | Baum .................... G08B 25/14 726/1 |
| 2011/0113008 | A1 | 5/2011 | Jafri et al. |
| 2011/0161124 | A1 | 6/2011 | Lappinga et al. |
| 2012/0110158 | A1* | 5/2012 | Koch .................. H04L 12/2816 709/223 |
| 2013/0269019 | A1 | 10/2013 | Garmark et al. |
| 2014/0068486 | A1* | 3/2014 | Sellers ................ G06F 3/04847 715/771 |

OTHER PUBLICATIONS

PCT Search Report dated Feb. 25, 2015, for application No. PCT/US2014/067228, 12 pages.
Chinese office action dated Jul. 6, 2018, for CN Application No. 20148006653.5, 10 pages.

* cited by examiner

FIG. 4
BROWSER APPROACH

"APPS" APPROACH

WEB-BASED INTERACTION WITH BUILDING AUTOMATION

BACKGROUND

The present embodiments relate to building automation. In particular, web-based interaction with building automation is provided.

Different building automation devices may be regularly configured, reviewed, and/or modified by different technical-oriented people during the lifecycle of the building automation system.

Two different and independent approaches are provided for access to information from the building automation system. In one approach, the respective configuration, commissioning, operation, and monitoring features are supported by an embedded Web-application within some of the building automation devices. Web-application restricts the communications to a specific (e.g., Internet Protocol (IP)) format. Room units and/or connectivity points into the building automation system that are convenient to technical people may not provide the proper connectivity for the web-application. As a result, other devices and/or programs are used to connect. In the other approach, a special purpose application is run to interact with non-IP controllers. The result of different approaches due to the different access points to the building automation system is a different look, feel, functionality, and/or usability depending on the access point.

BRIEF SUMMARY

By way of introduction, the preferred embodiments described below include methods, systems, instructions, and computer readable media for web-based interaction with building automation. The interaction, regardless of the access point, is browser based. For IP access, hypertext protocol (http) communications of the browser are performed. The web-enabled controller serves responses with building automation information. For non-IP access, a web-server operating as an application in the same device as the browser intercepts the http communication and reformats the communication as appropriate for the non-IP access. Based on a response from the building automation system, the local web-server responds to the browser in the same device. For communicating across different types of networks in the building automation system, controllers may use the embedded web-server to reformat as needed and route requests. The same look, feel, functionality, and/or usability may be provided using the browser regardless of the connectivity to the building automation network.

In a first aspect, a system is provided for web-based interaction with building automation. A building automation network includes at least a first operation or monitoring device hosting a first web-server and first building automation logic, a first room unit, and a communications link between the first operations or monitoring device and the first room unit. A first computer hosts a web browser and a second web-server. The web browser is configured to access the first building automation logic through the web-server. The first computer is configured to access the first building automation logic through the first room unit and the communications link using the web browser interacting with the second web-server.

In a second aspect, a method is provided for web-based interaction with building automation. A web browser operating on a computer sends a browser request for building automation information from a first building automation panel of a building automation system. The browser request is received at a second building automation panel of the building automation system, the browser request sent from the computer to the second building automation panel on a first type of network of the building automation system. The second building automation panel routes the browser request to the first building automation panel. The browser request is received at the first building automation panel from the second building automation panel. The browser request is sent from the second building automation panel to the first building automation panel on a second type of network of the building automation system. The second type of network is a different type than the first type of network. The first building automation panel responds to the browser request with the building automation information.

In a third aspect, a non-transitory computer readable storage medium has stored therein data representing instructions executable by a programmed processor for web-based interaction with building automation. The storage medium includes instructions for operating both a browser and a web-server by a computer connected with a building automation system, intercepting a hypertext transport protocol (http) request from the browser of the computer by the web-server of the computer, the http request being for building automation information, reformatting the http request into a building automation request for transfer over a serial link, transmitting the building automation request over the serial link, receiving a building automation response to the building automation request by the web-server, and serving a browser response to the http request by the web-server, the browser response being a function of the building automation response.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION OF THE DRAWINGS AND PRESENTLY PREFERRED EMBODIMENTS

In a browser-based approach, the automation device hosts the web-server and presentation logic for access when the client and the automation device may directly communicate over an IP enabled network. However, if the automation device is not reachable over an IP-based network, an application-based approach is used where the client (e.g., computer hosting the browser) also hosts the web-server and presentation logic.

The user interacts with the browser in either approach, providing the same look, feel, functionality and/or usability over all connectivity points of the building automation system. Technical operators use a standard browser to access an arbitrary automation device over different connection points in the building automation system. The operators navigate, view, configure, and modify any building automation objects using the same browser. The same user experience may be provided over any and all connectivity points. Both browser-based and application-based operation and monitoring allows the same user experience.

Figure 1:
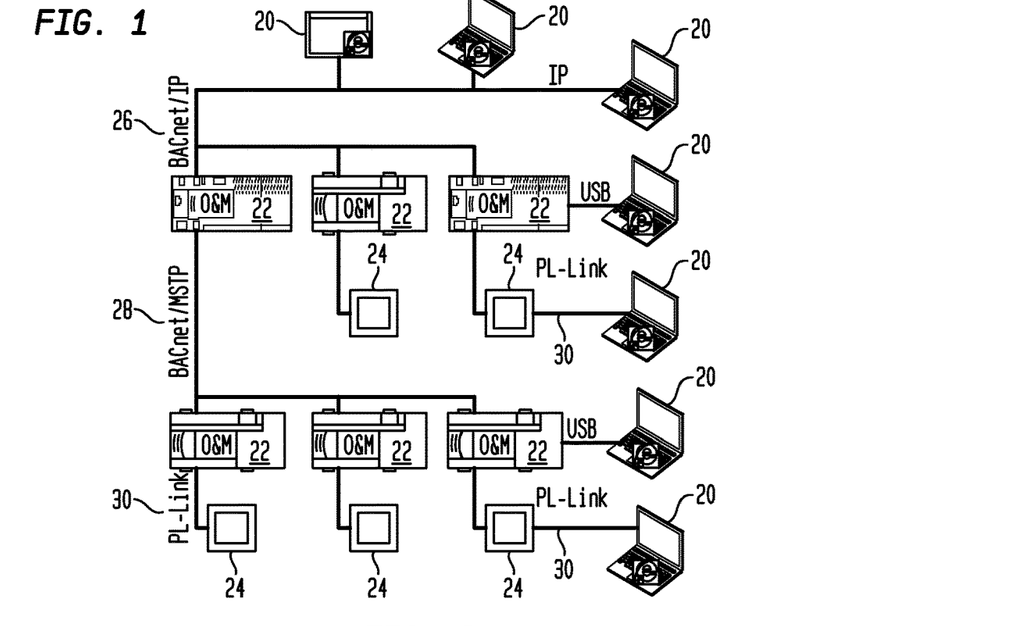
FIG. 1 is a block diagram of one embodiment of a building automation system for web-based interaction with building automation.

FIG. 1 shows a system for web-based interaction with building automation. The system is a building automation system or network for a factory, offices, campus or other building or group of buildings. The building automation system may provide heating, ventilation, and air conditioning (HVAC), fire safety, lighting, and/or industrial control. The system provides control capabilities and may include a user interface for interacting with the control and/or data acquisition of the process.

The building automation system includes one or more controllers 22, room units 24, and interconnecting networks 26, 28, and 30. Additional, different or fewer components may be provided. For example, only two types of interconnecting networks and corresponding links 26, 28, 30 are provided. As another example, one or more management workstations, human-machine interface devices, engineering stations, and/or other building automation components are provided. In the example of FIG. 1, six controllers 22 are provided in two groups of three associated with different network connections. One controller 22 is not connected with a room unit 24 while others are connected with single room units 24. In other embodiments, other arrangements are used. More than one room unit may connect with a given controller 22.

The building automation system implements control processes using controllers 22. The controllers 22 are panels, programmable logic controllers, workstations, operator stations, and/or remote terminal units. The controllers 22 include computers, processors, circuits, or other programmable devices for automation of electromechanical, chemical, pneumatic, fluid, electrical, mechanical, air, or other processes. For example, the controllers 22 control machinery on assembly lines, heating-ventilation-air conditioning (HVAC), refinery flow, mixing, or other devices or processes.

The controllers 22 may be configured to operate based on programming. The controllers 22 include control logic for operating and/or monitoring the building automation. Based on input at a user interface and/or a project provided over the network, the controllers 22 are configured to control one or more aspects of the industrial process, fire safety or HVAC based on triggers and/or report events.

Business logic for communicating building automation information about the control is provided on the controller 22. The business logic is directed to the control process being performed by the building automation system. The actions to perform and/or the set points for when to perform the actions may be programmed. The business logic interfaces to the control program so that the operation of the control logic and controller 22 is communicated and so that the control from remote devices is received. The work flow or series of actions may be configured.

Figure 2:
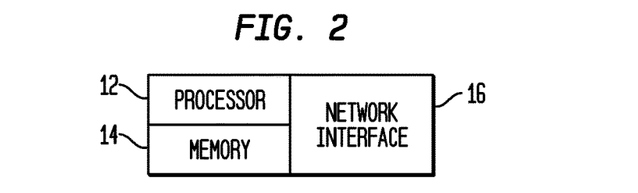
FIG. 2 is a block diagram of one embodiment of a component of a building automation system.

FIG. 2 shows one embodiment of one or more of the controllers 22. The controllers 22 are not required to be identical. For example, the controllers 22 are purpose built to withstand stresses and forces in the industrial environment and/or are computers.

The components include a processor 12, memory 14, and network interface 16. These parts provide for operation and communication in the building automation system. Additional, different, or fewer parts may be provided. For example, a display is provided. Any type of display may be used, such as LEDs, monitor, LCD, projector, plasma display, CRT, or printer.

The processor 12 is a general processor, central processing unit, control processor, graphics processor, digital signal processor, three-dimensional rendering processor, image processor, application specific integrated circuit, field programmable gate array, digital circuit, analog circuit, combinations thereof, or other now known or later developed device for use in the industrial control network. The processor 12 is a single device or multiple devices operating in serial, parallel, or separately. The processor 12 may be a main processor of a computer, such as a laptop or desktop computer, or may be a processor for handling tasks in a purpose-built system, such as in a programmable logic controller or panel. The processor 12 is configured by software and/or hardware.

The memory 14 is a system memory, random access memory, cache memory, hard drive, optical media, magnetic media, flash drive, buffer, database, graphics processing memory, video random access memory, combinations thereof, or other now known or later developed memory device for storing data. The memory 14 stores one or more datasets representing sensor readings, set points, and/or actuator status. The memory 14 may store calculated values or other information for reporting or operating in the network. For example, event data is stored. The memory 14 may buffer or store received communications, such as storing messages for parsing.

The memory 14 or other memory is a non-transitory computer readable storage medium storing data representing instructions executable by the programmed processor 12 for web-based interaction with building automation. The instructions for implementing the processes, methods and/or techniques discussed herein are provided on computer-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein are executed in response to one or more sets of instructions stored in or on computer readable storage media. The functions, acts or tasks are independent of the particular type of instructions set, storage media, processor or processing strategy and may be performed by software, hardware, integrated circuits, firmware, micro code and the like, operating alone, or in combination. Likewise, processing strategies may include multiprocessing, multitasking, parallel processing, and the like.

In one embodiment, the instructions are stored on a removable media device for reading by local or remote systems. In other embodiments, the instructions are stored in a remote location for transfer through a computer network or over telephone lines. In yet other embodiments, the instructions are stored within a given computer, CPU, GPU, or system.

The network interface 16 is a physical connector and associated electrical communications circuit for networked communications. For example, a network card is provided. As another example, a jack or port is provided. In one embodiment, the network interface 16 includes an Ethernet connector and corresponding circuit, such as a PHY chip, a PL-link port, and/or a master-slave token pathing (MSTP) port. Multiple ports of a given type may be used. Alternatively, wireless or other wired connection is provided.

The controllers 22 have network addresses or other identity for communicating within the building automation system. The room units 24 may or may not have network addresses, since the networking of communications for the room units 24 may be by direct connection to ports on the controllers 22. The network addresses correspond to the physical network interface 16 for the controller 22. Communications within the building automation system are routed to and from the controllers 22 over one or more of the communications links 26, 28, 30 of the different networks. The physical network interfaces 16 connect the controllers 22 to the building automation system for receiving and transmitting communications, such as messages.

Referring to FIG. 1, the controllers 22 operate and/or monitor building automation. The controllers 22 also handle communications within the building automation network. For example, the controllers 22 host web-servers. A server application is operated. The web-server responds to http or other Internet protocol requests from a client to serve information. For example, building information from building automation logic (e.g., events, set points, measurements, errors, logs or other information from the business logic) is served by the web-server for remote monitoring or control. Any now known or later developed web-server may be used.

The controllers 22 also host presentation logic. The presentation logic is part of or separate from the web-server. The presentation logic is hypertext markup language (html), java script, cascaded style sheet, or other format or design code for arranging the look and feel of data provided to a client, such as a browser. The presentation logic is configured by programming to control a presentation of the building automation information from the building automation logic of the controller 22. For example, the presentation logic controls what information may be updated or refreshed and the frequency. In alternative embodiments, the presentation logic is hosted on the client device rather than the server device.

Referring again to FIG. 1, the room units 24 are sensors and/or actuators. The sensors may include but are not limited to temperature, pressure, rate, current, voltage, inductance, capacitance, chemical, flow, or other sensors. Any number of sensors may be used. The actuators include but are not limited to magnetic, electric, pneumatic, or other devices for altering, moving, drilling, welding, mixing, spinning, changing, or otherwise actuating. The sensors and actuators communicate with the controllers 22 for control and measuring of the building environment.

The room units 24 are networked with the controllers 22. A communications link 30 is provided between the room units 24 and corresponding controllers 22. The communications link 30 may be a serial cable, such as a twisted pair of wires or other field bus. In one embodiment, the communications link 30 is a PL-link, such as for KONNEX (KNX) or compact communications. Other communications links may be used, such as European Home Systems Protocol or European installation bus.

Some of the controllers 22 are networked with a different type of network than the room units 24. For example, four controllers 22 communicate over master-slave token pathing (MSTP) communications links 28. RS-45, other two-wire serial connections, or other cabling connects the controllers 22. The MSTP communications link 28 is a network for communicating between the controllers 22 using the MSTP format. The MSTP communications link 28 may operate pursuant to the building automation and control network (BACnet) protocol. Other protocols and corresponding formatting and physical structures may be used.

Other controllers 22 are networked with yet another different type of network. The communications link 26 is an Ethernet cable or other communications path for IP communications. Any communications format may be used, such as PROFINET, HTTP, FTP, Ethernet, or Modbus TCP. Using BACnet or other protocol, an IP-based transport and physical layers are used for building automation communication. Any transmission medium may be used, such as a cable, like Ethernet or RS485, or a radio signal, such as WiFi or cellular network, or an optical signal via fiber optic/open air Switches and/or routers may be provided to switchably route communications to the desired devices in the building automation network. The communications links 26, 28, 30 of the different networks provide the paths for communications to and/or from the devices (e.g., controllers 22 and room units 24). The switches or routers interconnect the nodes of the building automation network using other cables or communications (e.g., wireless).

The building automation network includes two or more communications networks. For example, PL-link and BACnet/IP networks are provided. As another example, PL-link and BACnet/MSTP networks are provided. In yet another example shown in FIG. 1, PL-link, BACnet/MSTP, and BACnet/IP networks are used.

A computer 20 is represented in multiple locations of FIG. 1. This representation shows different possible connection points with the building automation network. Only one or any number of computers 20 may be connected with the building automation network at a given time. The connection may be remote, such as over the Internet, through a local area network, or over a wide area network. The connection may be local, such as within the networks 26, 28, 30 of the building automation system. The connection may be directly to a controller 22 and/or a room unit 24 or over a network.

The computer 20 is a personal computer, laptop, tablet, workstation, operator's station, engineering station, or other general or purpose built processing device. In one embodiment, the computer 20 is a processing device purpose built or configured to interact with the building automation network, such as being part of an installation, monitoring, and/or control component for configuring, monitoring, controlling, or operating the building automation system or components of the system. In another embodiment, the computer 20 is a general device for other uses than interaction with the building automation system, but includes an application for interacting with the building automation system.

The computer 20 includes a processor configured by instructions to perform operations. A memory is also provided. For example, the processor 12, memory 14, and/or network interface 16 of FIG. 2 are provided. The computer 20 includes a non-transitory computer readable storage medium having stored therein data representing instructions executable by a programmed processor for web-based interaction with building automation.

For interaction with the building automation network, the computer 20 hosts a web browser. A browsing program is installed on and may be operated by the computer 20. In response to user input on a user input device and display on a display, a user interface that includes a browser window, screen or other operating environment is invoked by a running instance of the browser. The browser is a general web browser, such as Explorer® from Microsoft, Firefox® from Mozilla, Chrome® from Google, or Safari® from Apple. Other now known or later developed general or purpose built web browsers may be used. The browser is a program for retrieving, presenting and traversing information resources on the Internet. The browser operates in an IP setting, such as using http, html, and java script. The browser is configured to be a client for requesting information.

The computer 20 also hosts a web-server. The same or different type of web-server is installed and operates on the computer 20 as on one or more of the controllers 22. The web-server is configured to receive IP formatted requests from a client and serve information. As implemented on the computer 20, the web-server is a virtual instance of a server. In other embodiments, the computer 20 is a server operating the web-server.

The web-server is installed on or provided as part of an application on the computer 20. For example, an application is installed on the computer 20 to provide for interaction with building automation systems. The application includes and installs the web-server as well as other instructions for interacting with building automation systems.

The computer 20 also hosts presentation logic. The presentation logic is hosted with the web-server, such as being part of the web-server, part of an application that also implements the web-server, or as a separate instance than the web-server. Like the presentation logic on one or more of the controllers 22, the presentation logic on the computer 20 is configured to control presentation of building automation information, such as using html, java script, and web design tools.

The presentation logic on the computer 20 is configured to provide the same or similar user interface with the web-browser as the presentation logic on the controllers 22. The identical presentation logic may be used. In other embodiments, the presentation logic differs to account for the different situations. The presentation logic of the controllers 22 is accessed over an IP network. The presentation logic in the computer 20 is used where the connection with the building automation system is non-IP, such as over a PL-link. Given possible differences (e.g., less) in bandwidth of the PL-link than IP link, the presentation logic may be altered to provide for different frequencies of updating or other variation while providing browser based monitoring and control with a similar or same look and feel regardless of the connection.

By providing the web-servers in both the computer 20 and the controllers 22, the computer 20 is configured to operate with access to the building automation logic through either web-server. Depending on the connection of the computer 20 to the building automation system, different web servers are available to interact with the browser hosted by the computer 20. The same browser and same or similar presentation logic provide for interaction with the building automation network regardless of the connection.

Figure 3:
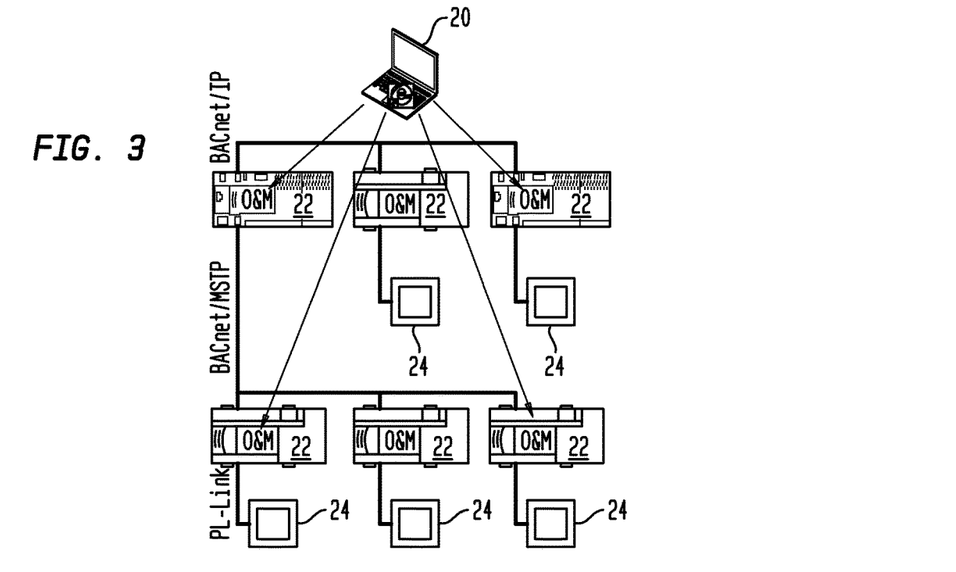
FIG. 3 is a logical connection diagram of the embodiment of FIG. 1.

FIG. 3 shows an example of the building automation system of FIG. 1, but with the computer 20 logically connected with any of the controllers 22, even controllers 22 only accessible through a PL-link (e.g., through a room unit 24) or through the MSTP network. FIG. 1 shows the computer 20 at various different possible connection locations to provide this logical connection of FIG. 3. The automation controllers 22 or room units 24 are accessed over any of different connectivity points, such as over the IP/Ethernet or BACnet/MSTP networks, over the local port of a device, or through a room unit 24 and PL-Link field bus connection. For example, a technician may be in a room and connect the computer 20 to a room unit 24 for ease of access. As another example, the technician is at a panel, so accesses the controller 22 by a direct universal serial bus or Ethernet link between the computer 20 and the controller 22. Access over the local port on the controller 22 or through room unit 24 may typically be required if the building automation network is not installed or running yet. In yet another example, the technician is at a control, operator, or engineering workstation, a remote computer, a service provider, or manufacturer of the building automation system and connects through a firewall or from within the IP network 26 to the desired controller 22.

For using IP communications in the building automation system, a browser-based operation is provided. The computer 20 connects, such as by a cable or wireless linking, with one or more of the controllers 22 through the IP or Ethernet communications link 26. This IP or Ethernet communications link 26 may use the IP or Ethernet network of the building automation network or may be a direct (e.g., USB) connection from the computer 20 to the controller 22. This connection allows the browser on the computer 20 to be a client to the web-server on the desired controller 22. The web browser is configured to access the building automation logic of the controller 22 through the web-server hosted on the controller 22.

Figure 4:
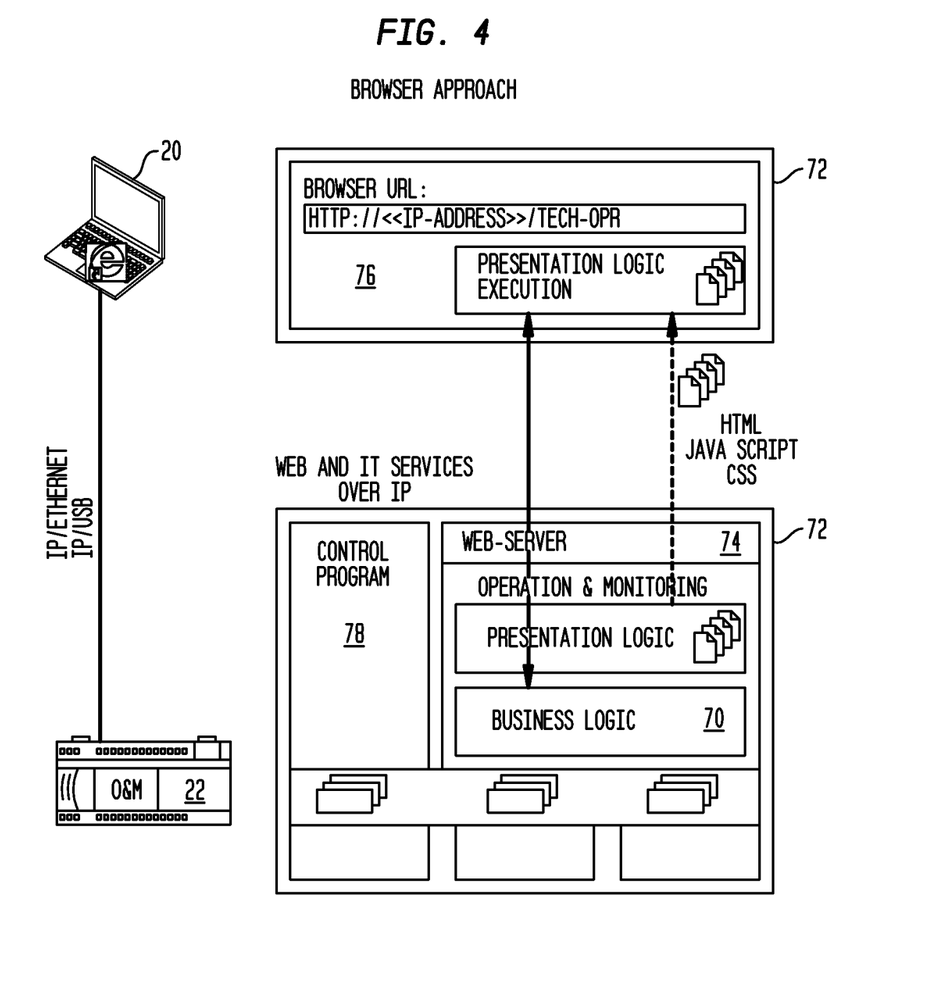
FIG. 4 illustrates a browser-based approach for building automation communications over an IP network.
Figure 5:
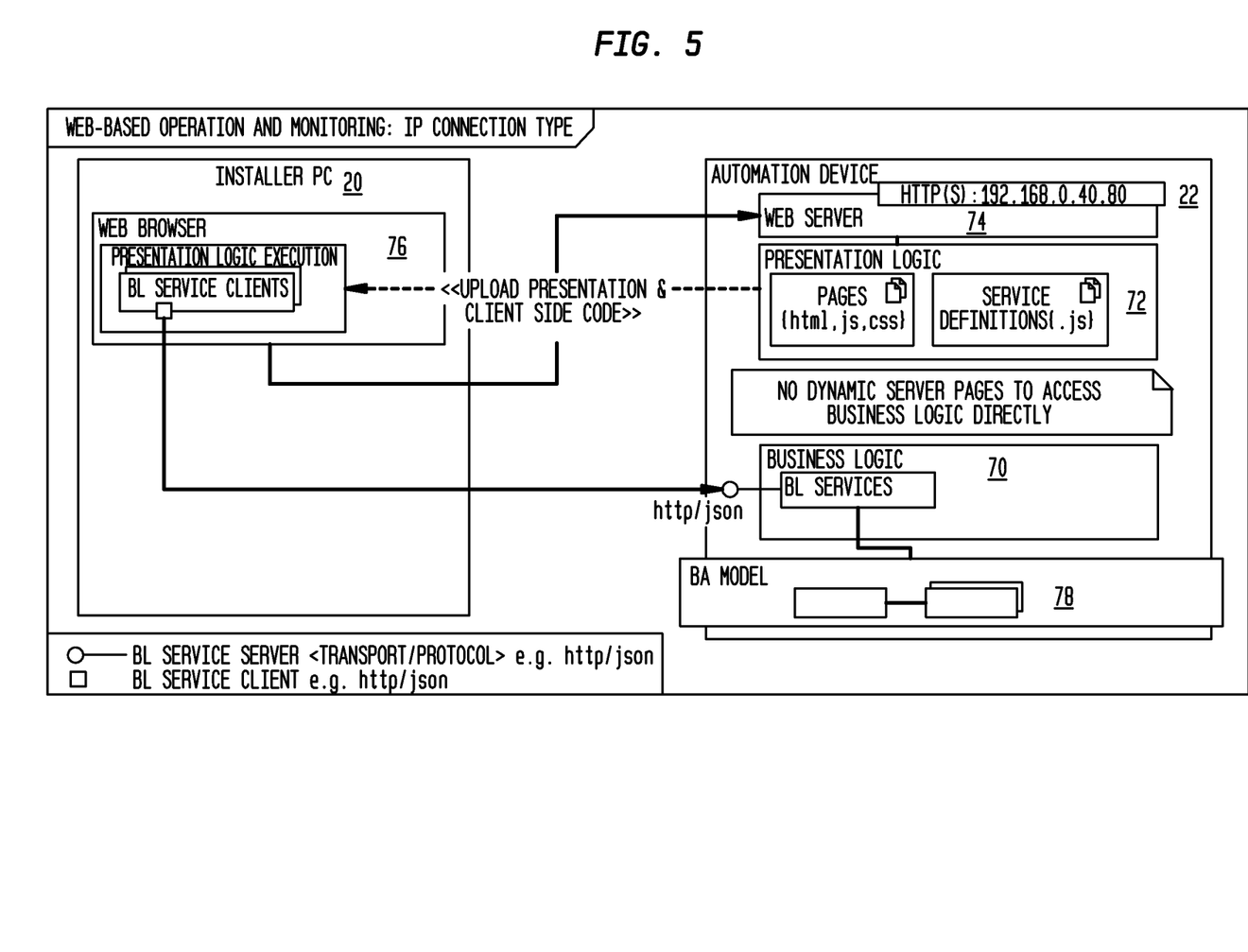
FIG. 5 shows a connection diagram of the embodiment of FIG. 4.

FIGS. 4 and 5 illustrate the arrangement for obtaining information from the building automation logic (i.e., business logic 70) of the controller 22 of the browser-based approach. FIG. 4 shows the layering of the various program components. FIG. 5 shows the IP connections.

The business logic 70 obtains or is part of the control program 78 for operating the controller 22. The controller 22 also includes a web-server 74. The web-server 74 works with or includes the presentation logic 72 and the business logic 70. In the embodiment shown, a web application of the controller 22 includes the web-server 74, presentation logic 72 and business logic 70. The web-server 74 communicates or instantiates the business logic 70 to obtain information to serve in response to a browser request.

The computer 20 includes the browser 76. The browser 76 is directed to the controller 22, such as by inputting an address for the controller 22 as a uniform resource locator (URL) for the desired controller 22. Using http communication, the web-sever 74 of the controller 22 is requested to send building automation information. The browser 76 establishes an IP communications session with the web-sever 74. In one embodiment, the client side, executing Ajax or other services in the browser 76, directly calls the business logic services in the controller 22 using http(s) as transport, java script object notation, and/or other data formatting as a protocol binding.

In response, the presentation logic 72 is initially uploaded to the client (i.e., browser 76) using the http protocol and then executed in the browser 76. The presentation logic 72 uploaded from the automation device contains the business logic service definitions and the client side implementation. The process and configuration data to be rendered by the presentation logic 72 is provided by the business logic 70 through the web-server 74 and updated as the data values may change over time. In other embodiments, the automation values are provided in response to a request and not otherwise updated. The presentation logic 72 creates a user interface in the browser 76 for the technician, through the computer 20, to interact with (e.g., monitor, control, or operate) the controller 22.

In one embodiment, the presentation logic 72 limits the server pages of the controller 22. No dynamic server pages are used in order to have a uniform concept to allow hosting of presentation logic outside of the device. In alternative embodiments, dynamic server pages are provided.

Figure 6:
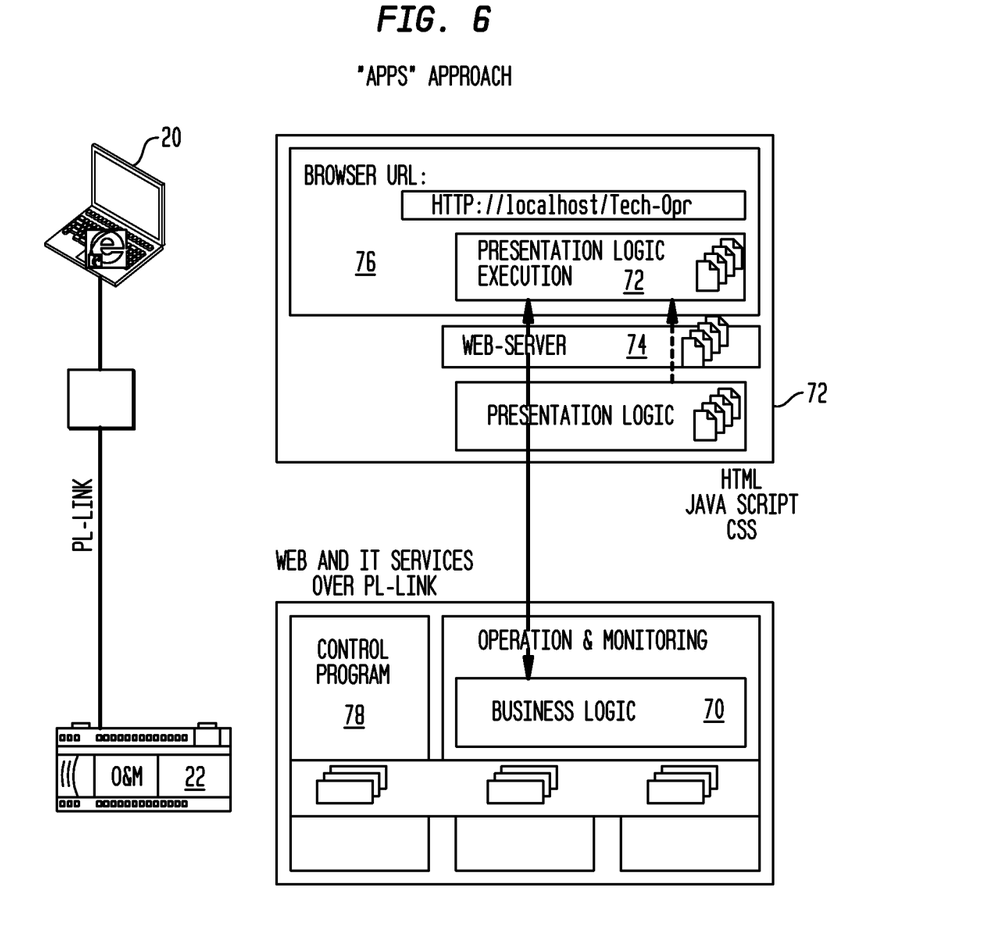
FIG. 6 illustrates an application-based approach for building automation communications over a non-IP network.
Figure 7:
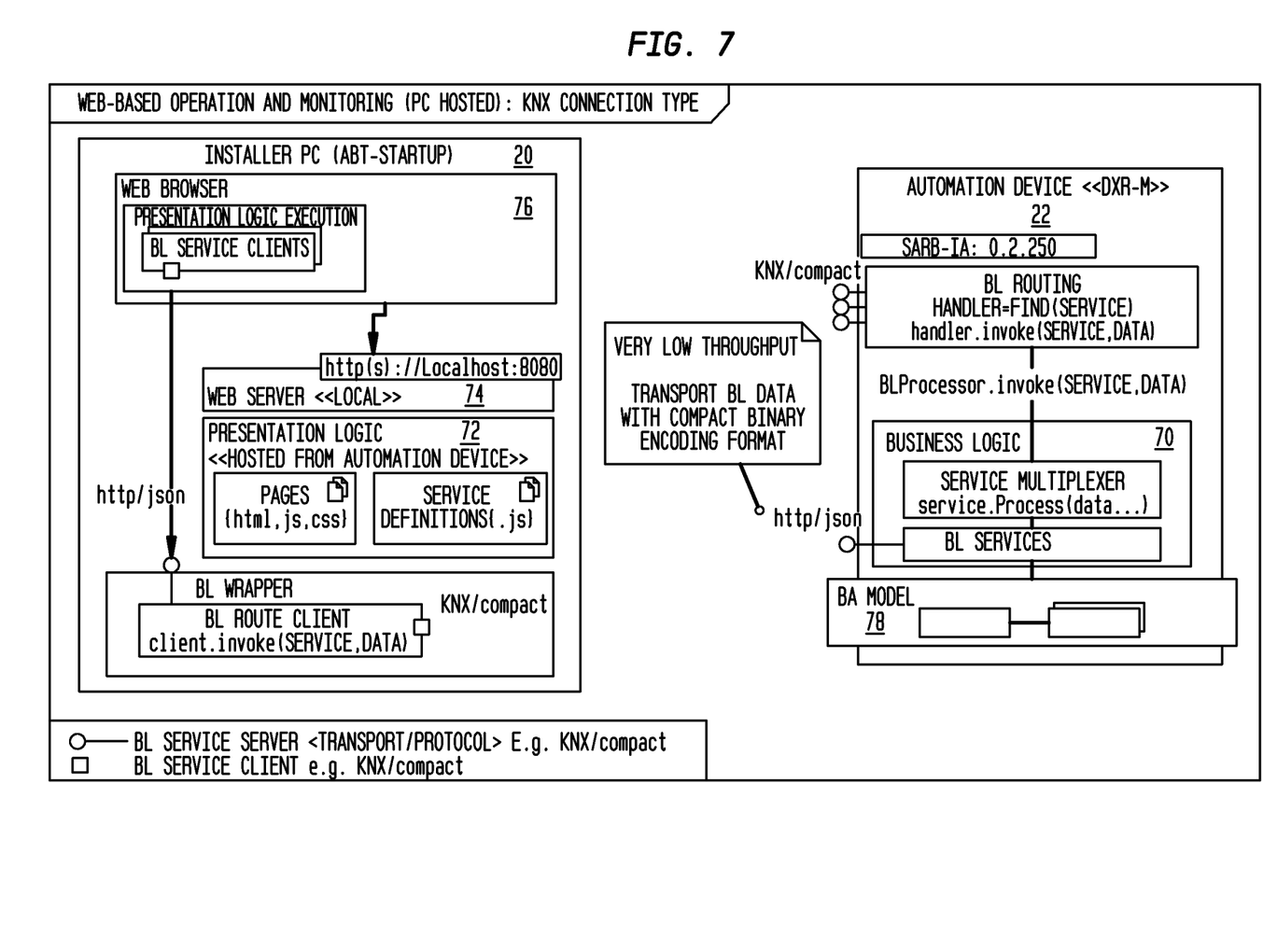
FIG. 7 shows a connection diagram of the embodiment of FIG. 6.

In another approach, a different arrangement of the web-server 74 is used. FIGS. 6 and 7 illustrate an application-based approach for browser interaction. FIG. 6 shows the layering of the various program components. FIG. 7 shows the IP connections. In the application-based approach, the communications pass through one or more non-IP communications links, such as the MSTP or PL-links. For example, the computer 20 connects with a room unit 24 or connects through a MSTP network to access the controller 22.

Since full path IP communications are not available, IP browser based communications are not available. For ease of use by a technician or other user, the browser 76 is still used to communicate with the desired controller 22 despite the lack of an IP-based connection. The computer 20 is configured to access the building automation logic (e.g., business logic) of the controller 22 using the local web-server 74 in the computer 20. The web server 74 in the computer 20 also includes or is associated with a separate instance of the presentation logic 72.

If the browser may not directly communicate with the web-server 74 of the controller 22 over an IP-connection, the application-based approach is used. The client (e.g., computer 20 with the browser 76) hosts the web-server 74 and the presentation logic 72 as embedded as an application on the computer 20. A personal computer tool hosts the presentation logic 72 of the automation device via the local web server 74.

The browser 76 of the computer 20 requests building automation information. The web-server 74 of the computer 20 intercepts or receives the request and serves the response. To create the response, building automation information is acquired and presentation logic 72 is provided. In the same way as in the browser approach, the presentation logic 72 is initially loaded in the browser 76 and then executed, but is from the computer 20 itself.

The web-server 74 in the computer 20 reformats the request in the manner appropriate for communications in the building automation network. For example, the client side business logic service calls are intercepted locally on the computer 20 and converted into another transport, protocol binding (eg., KNX or compact). Non-IP based transport via KNX TP1 is used in this example, but other transport protocols may be used. The low bandwidth capabilities of the KNX transport results in using a different optimized encoding format than IP to exchange dynamic data.

The process and configuration data to be rendered is provided and updated by the business logic 70 in the controller 22 in response to the request from the web-sever 74 in the computer 20. The web-server 74 then formats the building automation information as appropriate for IP communications with the browser 76. The web browser 76 uses pc local IP based http communication to upload the presentation logic 72 containing the business logic (BL) service definitions and client side implementation.

Minimizing the data to be transmitted may achieve an acceptable latency on networks with low bandwidth, such as when using a PL or MSTP communications link. Data communication may be limited by hosting the presentation logic 72 on the client and by exchanging and updating only data that is modified or changed.

This application-based approach uses the browser 76 to present the building automation information. The presentation and user experience is the same or similar regardless of the connection to the building automation system. Due to lower bandwidths, the performance, update frequency or other characteristic of the presentation may be lower for KNX or MSTP connections than IP. The look and feel may be the same or similar.

Figure 8:
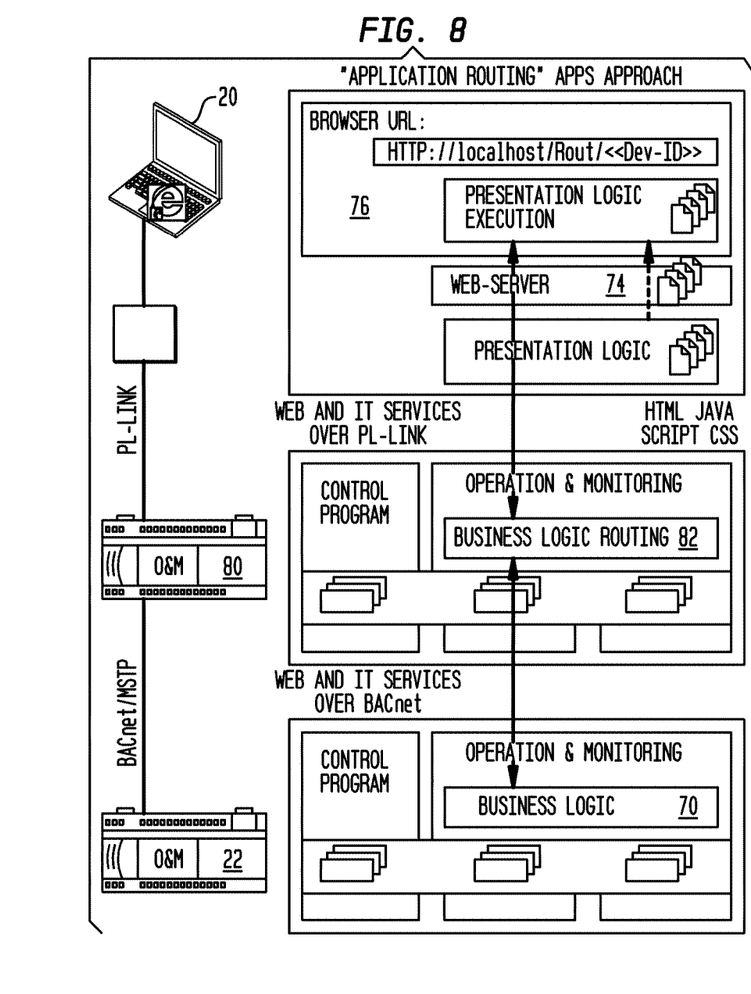
FIGS. 8 and 9 illustrate application-based and browser-based approaches, respectively, for building automation communications over multiple ones of different communications networks in the building automation system.
Figure 9:
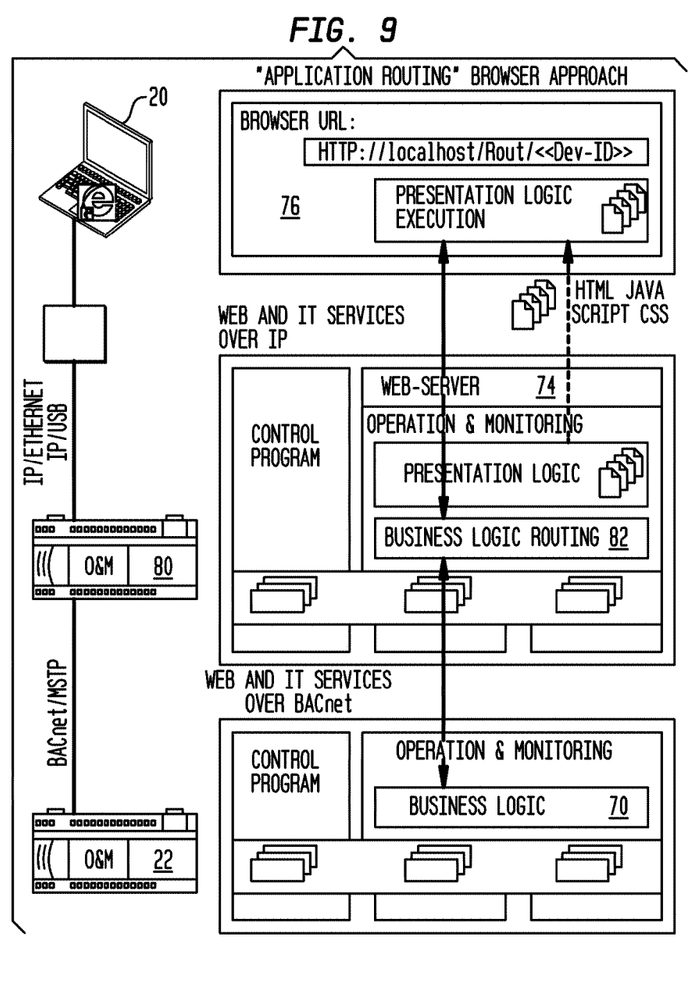
Figure 10:
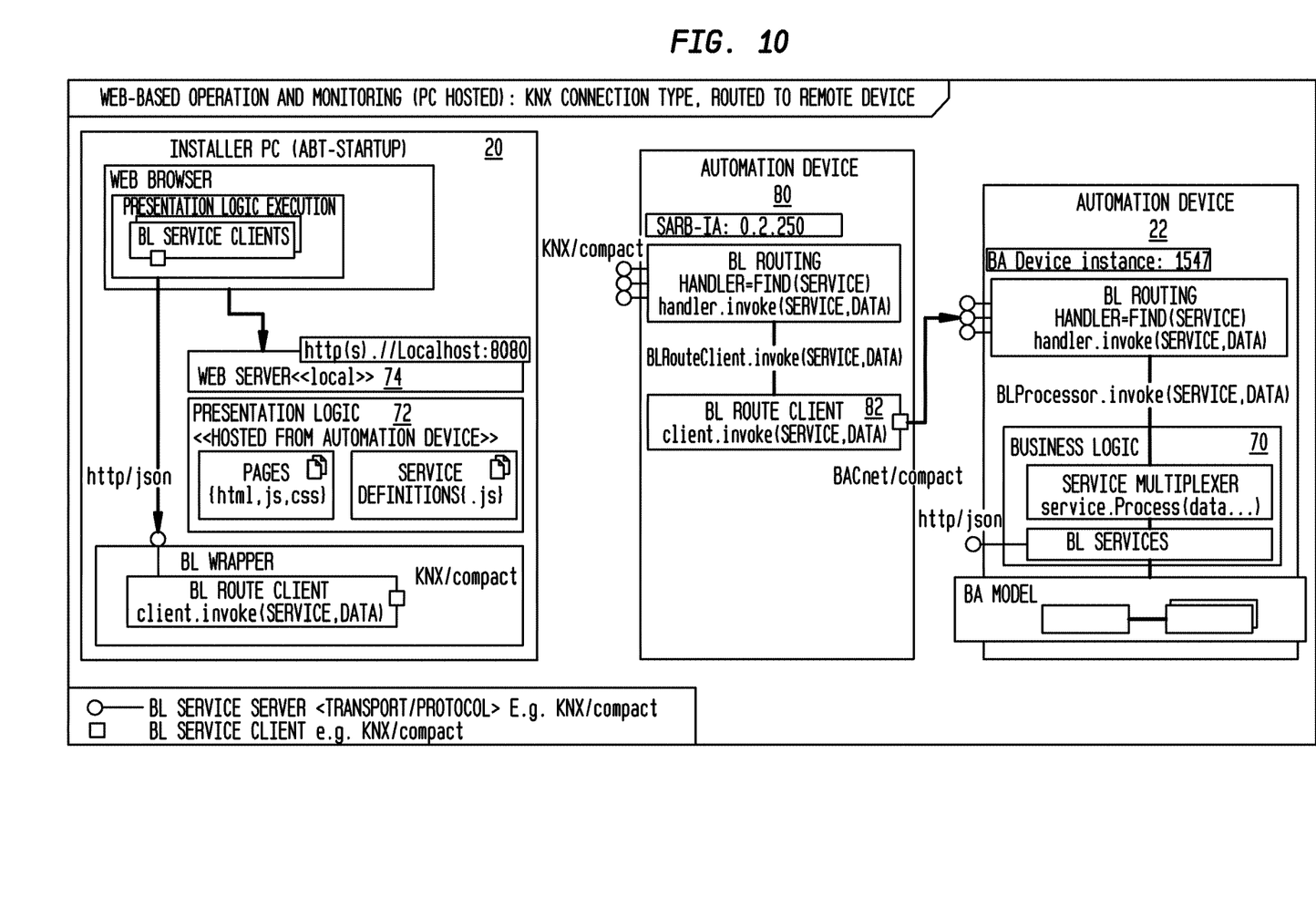
FIG. 10 shows a connection diagram of the embodiment of FIG. 8.

FIGS. 8-10 show examples were an intervening device 80 within the building automation network routes requests and/or responses. If the client (i.e., browser 76 on the computer 20) and the respective target automation device (e.g., web-server 74 on a controller 22) are not directly connected, two or more networks running different application protocols may be involved in the data exchange. In such a case, a building automation device (e.g., controller 22 as the intervening device 80) lying between the client and the target device forwards respective exchanging and updating messages. For example, the computer 20 connects through a PL-link or IP network to one controller 22, 80, but is requesting building automation information from another controller 22. The controllers 22 are connected through a network, such as a MSTP network.

The controllers 22 (all or a sub-set) host a routing program 82. By hosting a router 82, the requests and responsive information may be routed over the network. The router 82 is configured to route communications to and from the browser 76 and the business logic 70 of another controller 22. While FIGS. 8 and 9 show one intermediary router 80, more than one router may be provided, such as where the request is sent over three or more hops within the building automation network.

The controller 22 hosting the router 80 may or may not use an embedded web-server 74 and corresponding presentation logic 72. As shown in FIG. 8, a connection through a PL link operates in the application mode. The computer 20 uses the embedded web-browser 76 and presentation logic 72 to intercept the browser request. The request is reformatted as appropriate for the PL-link or other network communications and sent to the connected controller 22. If the request is addressed to another controller 22, the router 82 sends the request to the other controller 22. The router instance in the controller 22 forwards the business logic service call to the addressed controller 22. The other controller 22 receives the request and responds. The response is sent back to the computer 20 using the same or different routing.

The routing may reformat the request, such as changing to a MSTP request, or the request may be routed without reformatting. The forwarding routing client or router 82 may change to another transport, protocol binding (e.g., BACnet/ compact). In consequence, the router instance listens on multiple transport bindings as represented in FIG. 10. The controller 22 includes ports for different types of connections. The router instances on the controllers listen at each of the different ports simultaneously or sequentially. For example, PL-link, MSTP, and IP ports are monitored for received requests. The routing instance may also be used by the destination controller 22 for identifying requests to be answered by the controller 22.

As shown in FIG. 9, the browser approach is used with a connection between the computer 20 and the first, edge, or initial controller 22 when an IP connection (e.g., Ethernet or USB) is provided. The web-server 74 and presentation logic 72 of this first controller 22 is used to respond to the browser 76 on the computer 20. To obtain the information from the other or desired controller 22, the web-server formats a request appropriate for the back-end network or for the network interconnecting the controllers 22 (e.g., formats the request for MSTP communications). The response from the other controller 22 is received by the first controller 22 and reformatted into a web-based browser response (e.g., html and java). The browser response is sent to the browser on the computer 20 from the first controller 22.

Any router 82 may be used. In one embodiment, the router 82 includes a routing table provided by user entry or created from network mapping or neighbor detection. A generic invoke server uses addressing in headers for routing without decoding and/or examining the payload of the messages. A hierarchical routable server name may be used for routing. The additional overhead for business logic routing is kept to a minimum by routing just based on headers or addresses and a routing table. In other embodiments, intelligent routing relying on the content of the payload is provided.

Figure 11:
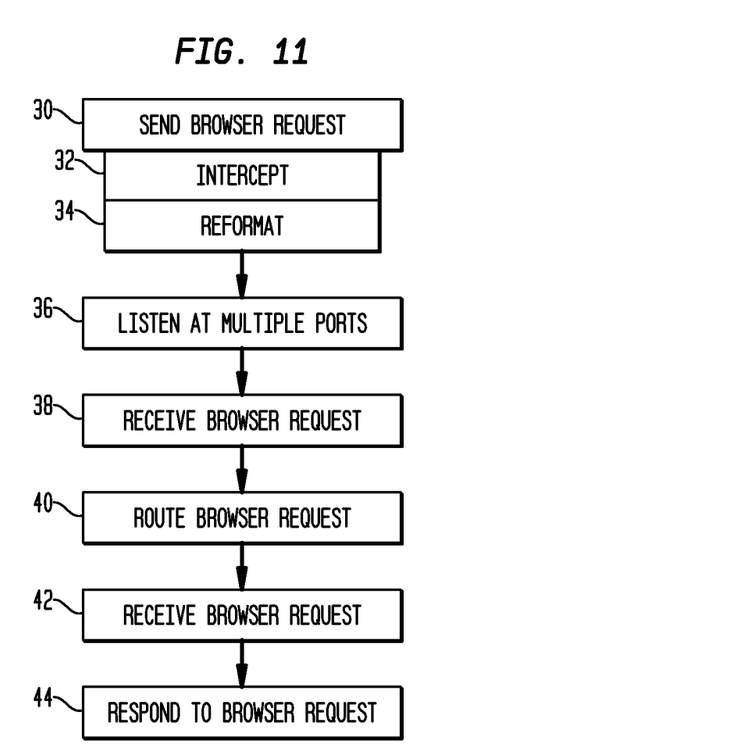
FIG. 11 is a flow chart diagram of one embodiment of a method for web-based interaction with building automation.

FIG. 11 is a flow chart diagram of one embodiment of a method for web-based interaction with building automation. The acts of FIG. 11 deal with using a browser to request building automation information. The browser request in FIG. 11 is for such requests formatted for IP communications by the browser or reformatted in other formats for transmission over non-IP networks of the building automation system. The user interacts with a browser regardless of the type of connection of the computer with the building automation network. The computer and/or the building automation network provide for reporting building automation information based on the type of connections or networks involved while providing the user with a common look and feel.

The method is implemented by the system of FIG. 1, a component of FIG. 2, one of the arrangements of FIG. 4, 6, 8, or 9, the computer 20 of FIG. 1, or another system and/or component. The acts are performed in the order shown or other orders. For example, act 36 is performed before or simultaneously with act 30.

Additional, different, or fewer acts may be provided. For example, acts 32 and 34 are performed for application-based approach but not for a browser-based approach. As another example, acts 40 and 42 are not performed where routing is not used for the request, such as where the computer directly connects or connects through a room unit to the controller 22.

In act 30, a browser sends a request for building automation information from a building automation panel of a building automation system. The browser is run on a computer connected to the building automation system. Any connection may be used, such as a connection to an IP network of the building automation system by a management workstation or a temporary connection through wired or wireless connection to the IP network, PL-link, or MSTP network.

The browser operates on a connected computer, such as a workstation, installation tool, or personal computer. The browser sends a standard request, such as a http-based request (request in http format). The user navigates the browser to a URL or address for the desired building automation panel. The URL may be selected from a list of panels. In response to activation of the link, a request for information from the panel is sent with the browser as a client.

If the panel being addressed or another panel is directly connected to the same IP network as the computer, the method proceeds to act 36. If the panel being addressed is accessed through a non-IP link from the computer, then an embedded web-server on the computer intercepts the request in act 32. The web-server scans requests sent from the browser. Any requests addressed to building automation panels when a non-IP connection is used from the computer are intercepted by the web-server. In act 34, the request is reformatted as appropriate for the communications link from the computer. For example, the request is reformatted as a BACnet communication over a PL-link.

In act 36, building automation components listen for browser requests. The listening is on any number of types of ports. For example, PL-link ports, MSTP ports, and IP ports are scanned for incoming messages in the associated buffers. The building automation components listen at any type of port over which browser requests may be received, such as ports for different networks used in the building automation system (e.g., IP, MSTP, and KNX/compact networks). For the dynamic data exchange between the presentation logic and the business logic, the business logic services may use a remote procedure call (RPC) style framework with various bindings for transports and encoding protocols. These bindings may change during business service transmission between business logic entities depending on which of the different networks is used for communications.

In act 38, the building automation panel receives the browser request as formatted for the network over which the request is received. For example, the edge building automation panel receives the requests either as an IP-based browser request or over a PL link from a room unit connected to the computer. The request sent from the computer is either reformatted in act 34 or is received in the native format of the browser.

In act 40, the building automation panel initially receiving the request is not the destination of the request. The building automation panel routes the browser request to the destination or another intervening node of the building automation network.

The request is formatted for the further routing. Where the request is an IP request and is to be routed over an IP network, the request is forwarded without reformatting. Where the request is a KNX or compact request over PL link or IP request to be routed over a MSTP network, the request is reformatted for the MSTP network. A web-server of the building automation panel intercepts the browser request and formats the request for routing over a different network. Other examples of change in network for routing are possible. In other embodiments, no further routing is needed as the building automation panel receiving the request is the destination.

In act 42, the browser request that has been formatted is received in the appropriate format. For example, a browser request is received over a MSTP connection from another building automation panel. Multiple types of networks are used to provide the request to the destination. The browser request is formatted as appropriate for the different networks.

In act 44, the destination building automation panel responds to the browser request. For an IP formatted request, a web-server of the panel responds to the request. For requests formatted for transport over other networks, the building automation panel responds to the request. For example, the building automation panel responds to a BACnet request for current measured values, events, errors, or set points. Any building automation operation and/or monitoring response is provided. A web server along the routing path or at the computer, depending on the networks over which the response traverses, converts the response into an IP-based browser response for replying to the browser generated IP request.

Figure 12:
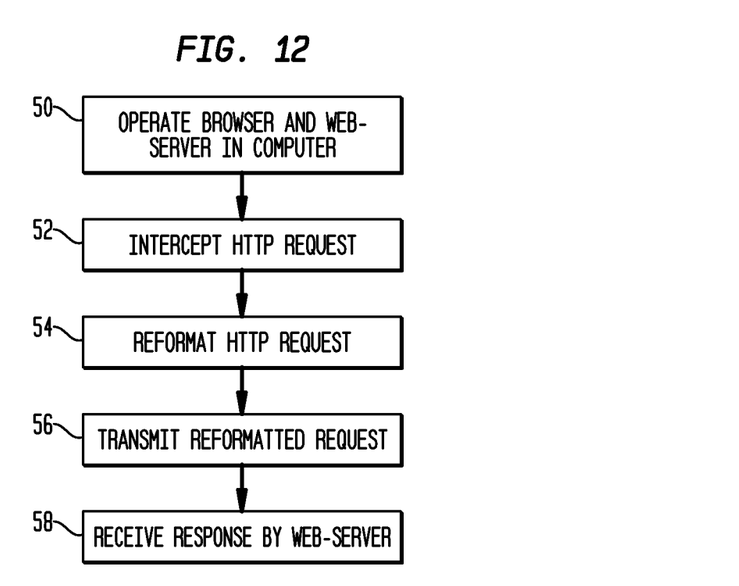
FIG. 12 is a flow chart diagram of one embodiment of an application-based approach for web-based interaction with building automation.

FIG. 12 is a flow chart diagram of one embodiment of a method for web-based interaction with building automation. The acts of FIG. 12 deal with using non-IP connections of the computer with the building automation network while still providing a browser-based user interaction. FIG. 12 is directed to the application-based approach where an application, including a web-server, is added to the computer for interacting with the building automation system. A web-server local to the computer running the browser is used to reformat the request as needed for the building automation system, gather the requested information, and serve the response to the browser.

The method is implemented by the system of FIG. 1, a component of FIG. 2, one of the arrangements of FIG. 4, 6, 8, or 9, the computer 20 of FIG. 1, or another system and/or component. The acts are performed in the order shown or other orders.

Additional, different, or fewer acts may be provided. For example, acts for routing are added. As another example, acts for transmitting IP-browser requests over an IP network for serving by the building automation panel using an IP-based response are provided.

In act 50, both a browser and web-server are operated by a computer. The computer is connected with the building automation system for monitoring, testing, controlling, resetting, reprogramming, operating, or otherwise interacting with the building control system. The computer is used by a user to interact with the building control system.

The browser is a computer program for Internet searching, display, or other browsing actions. The browser operates pursuant to the IP suite of protocols. For example, the browser operates pursuant to http. Html, java, or other information may be used to format a display or otherwise create a user interface that interacts with a server. Off the shelf or generally available browsers may be used. In other embodiment, a purpose built browser is used as a client.

The web-server is a computer program for responding to requests from the browser or other client. The web-server operates on a front end with IP communications, such as from the browser. On a back end, the web-server interacts with a database, other processors, or other devices to control, gather information, or otherwise respond to requests from the browser. For example, the web-server may obtain information from components of the building control system using building automation formats or processes.

The same computer running the browser and web-server may also include presentation logic. The presentation logic controls the user interface created on the browser. The way in which the information is presented and the look and feel of the browser display is controlled by the presentation logic. Values or other information provided in the display is provided by the building control system.

In act 52, an http or other request from the browser is intercepted. This act is the same or similar to act 32 of FIG. 11. The web-server, run on the same computer as the browser, intercepts the http request from the browser rather than transmitting the IP-formatted request from the computer. Any requests addressed for a building automation component are intercepted by the web server.

In act 54, the http request is reformatted into a building automation request for transfer over a serial or other non-Ethernet link with the building automation system. For example, the web-server generates a KNX or compact request for building automation information to be transmitted through a PL link. Rather than sending the IP-based browser request, the requested information is obtained by sending the request in a native building automation format other than IP.

In act 56, the reformatted message is transmitted by the web-server to the connected component of the building automation system. For example, the request is transmitted over a serial PL-link. The transmission is to a room unit for further transmission to a controller, such as an operations and monitoring unit connected with the room unit through the PL-link.

The operations and monitoring unit receives the request and provides building automation information back as a response. The responsive information is received by the web-server on the computer in act 58. The received building automation information is reformatted for IP communications and served to the browser by the web-server residing on the same computer. Html, java, or other information is generated in a layout provided by presentation logic and transmitted internally to the browser as a server response.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A system for web-based interaction with building automation, the system comprising:
a building automation network including at least a first operations or monitoring device hosting a first web-server and first building automation logic, a first room unit, and a communications link between the first operations or monitoring device and the first room unit, wherein the communication link is not an IP network connection; and
a first computer separate from the first operations or monitoring device and the first room unit, the first computer hosting a web browser and a second web-server, wherein the first computer is configured such that:
when the first computer is connected to an IP network, the web browser is configured to access the first building automation logic by the web browser interacting via a hype r-text-transfer protocol including http and/or https with the first web-server hosted by the first operations or monitoring device and not through the second web-server hosted by the first computer; and
when the first computer is connected via a port on the first room unit to the communication link, the web browser hosted by the first computer is configured to access the first building automation logic through the port of the first room unit and the communications link using the web browser interacting via http and/or https with the second web-server hosted by the same first computer, wherein the first room unit is operative to communicate with the first operations or monitoring device to enable controlling and measuring a building environment, and wherein the first computer is configured to operate with the access to the first building automation logic, which is hosted by the first operations or monitoring device, by the web browser through the first web-server of the first operations or monitoring device or the second web-server of the first computer, the operation depending on a connection of the first computer with the building automation network.

2. The system of claim 1 wherein the communications link is a PL-link and wherein the first computer connects with the first room unit through a PL-link port to access the first building automation logic through the first room unit.

3. The system of claim 1 wherein the first computer is connectable with the first operations or monitoring device through a networking protocol to access the first building automation logic through the first web-server.

4. The system of claim 3 wherein the networking protocol comprises an Internet protocol on an Ethernet network.

5. The system of claim 1 wherein the first computer is directly connectable with the first operations or monitoring device through a port to access the first building automation logic through the first web-server.

6. The system of claim 1 wherein the first computer comprises a personal computer, laptop, or tablet, and wherein the web browser comprises a program for retrieving information using a uniform resource locator.

7. The system of claim 1 wherein the first computer includes first presentation logic with the second web server, and wherein the first operations or management device includes second presentation logic with the first web-server, the first and second presentation logic configured to control a presentation of building automation information from the first building automation logic.

8. The system of claim 7 wherein the first and second presentation logic are configured to create a user interface with the web browser where the user interface includes a same format for access to the first building automation logic through the first room unit and through the first operations or management device.

9. The system of claim 7 wherein the first and second presentation logic are identical.

10. The system of claim 1 further comprising a second operations or monitoring device hosting a router, the second operations or monitoring device connected to the first operations or monitoring device through a master-slave token pathing network, the router configured to route communications to and from the browser to the first operations or monitoring device.

11. The system of claim 1 wherein the second web-server is configured as an application on the first computer.

12. In a non-transitory computer readable storage medium having stored therein data representing instructions executable by a programmed processor for web-based interaction with building automation that cause the processor to carry out a method comprising:

operating both a browser and a web-server by a computer connected with a building automation system via a port on a first room unit that provides a serial link, wherein the first room unit is operative to communicate with an operations and monitoring unit of a building automation system to enable controlling and measuring a building environment, wherein the computer is separate from the first room unit and the operations and monitoring unit;

intercepting a hyper text transport protocol (http) request from the browser of the computer by the web-server of the computer, the http request being for building automation information;

reformatting the http request into a building automation request for transfer over the serial link;

transmitting the building automation request to the operations and monitoring unit of the building automation system over the serial link via the port on the first room unit;

receiving, by the web-server, a building automation response to the building automation request from the operations and monitoring unit of the building automation system over the serial link via the port on the first room unit; and serving a browser response to the http request by the web-server, the browser response being a function of the building automation response.

13. The non-transitory computer readable storage medium of claim 12 wherein reformatting comprises reformatting for transfer over a PL-link, further comprising operating presentation logic for the browser in the computer, wherein the http request includes an http and/or https communication.

* * * * *